W. J. WARNER.
WATER HEATER.
APPLICATION FILED APR. 27, 1916.
1,256,851.
Patented Feb. 19, 1918.
2 SHEETS—SHEET 1.
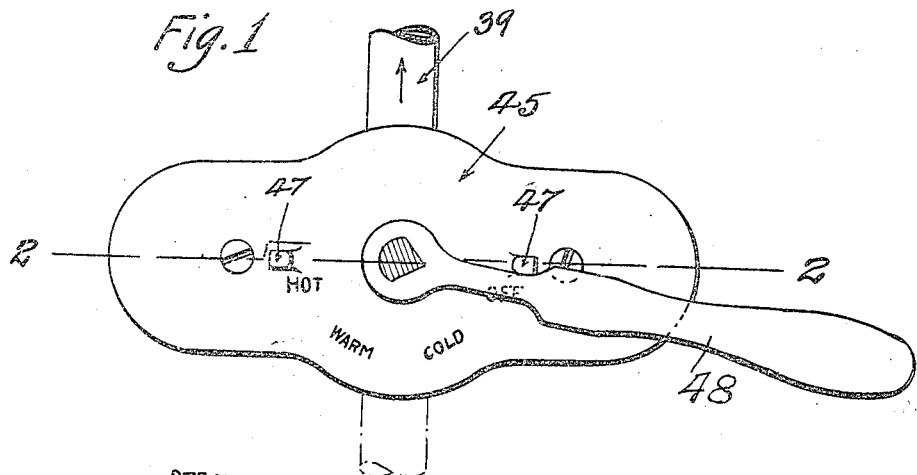
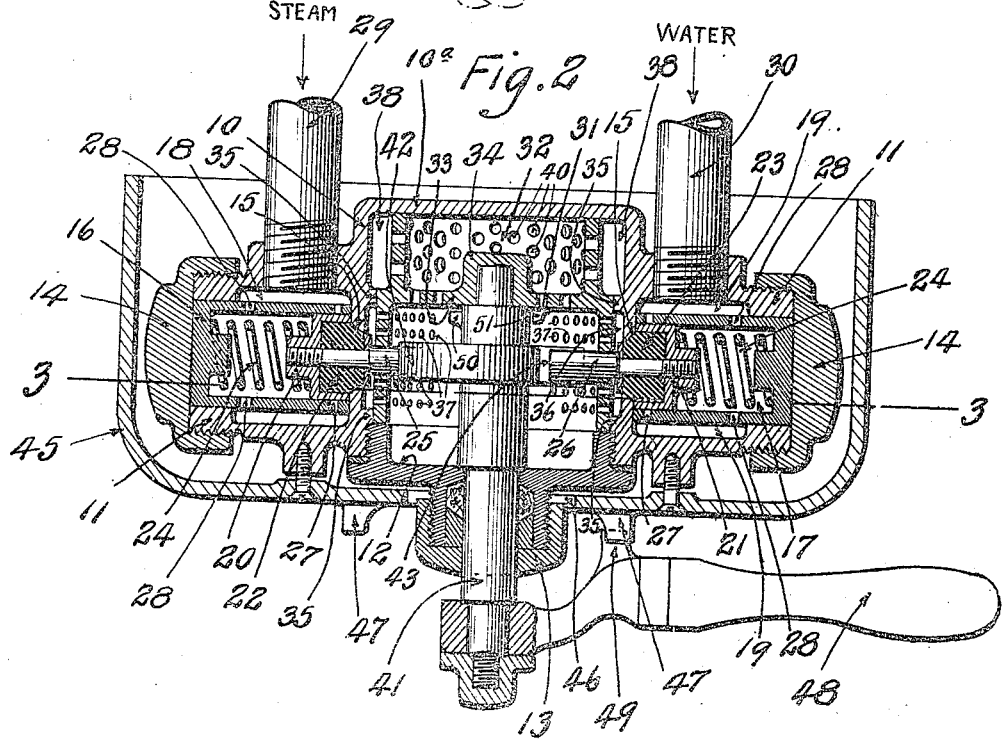
Inventor
Walter J. Warner

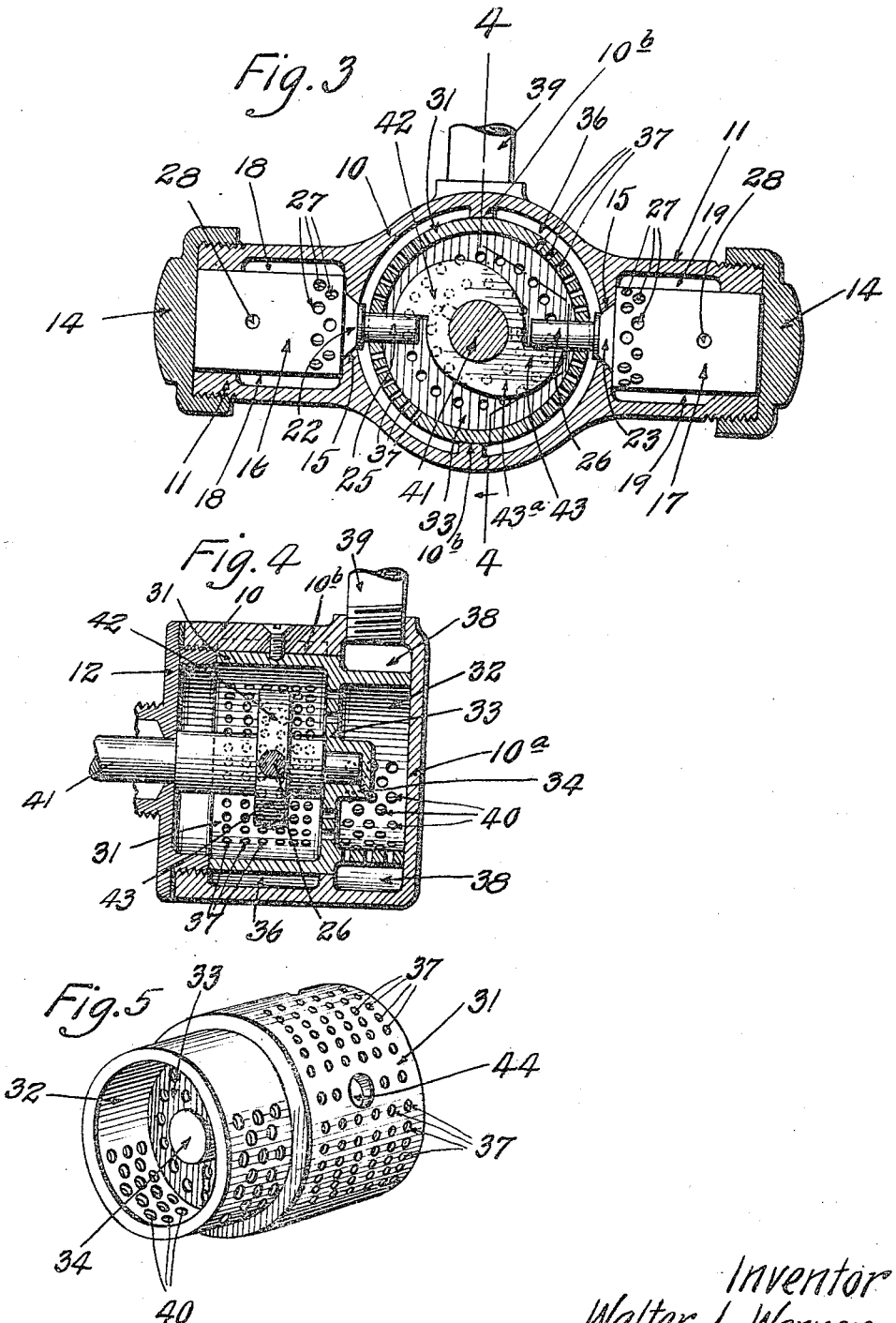

UNITED STATES PATENT OFFICE.

WALTER J. WARNER, OF ST. LOUIS, MISSOURI.

WATER-HEATER.

1,256,851.

Specification of Letters Patent.    Patented Feb. 19, 1918.

Application filed April 27, 1916.   Serial No. 94,067.

*To all whom it may concern:*

Be it known that I, WALTER J. WARNER, a citizen of the United States, residing at St. Louis, Missouri, have invented a certain new and useful Improvement in Water-Heaters, of which the following is a full, clear, and exact description, such as will enable others skilled in the art to which it appertains to make and use the same, reference being had to the accompanying drawings, forming part of this specification.

My invention relates to a device particularly designed for heating water by the mixing therewith of live steam, the principal object of my invention being to provide a comparatively simple, inexpensive and easily operated water heating device which is applicable for use wherever live steam and water are available, and which device is practically instantaneous in action, thereby making it particularly desirable for use in kitchens, laundries, bath and wash-rooms, and for manufacturing processes.

Further objects of my invention are to provide a water heater having a single handle or lever for controlling the opening movements of the water and steam valves; further to provide a water heater wherein the live steam is divided into comparatively small jets and thoroughly mixed and commingled with the entire body of water flowing through the device to heat said water prior to its discharge through the outlet, and further to provide a device wherein the valve operating mechanism is arranged so that the opening movement imparted to the valves is regulated with the result that unheated water can be obtained by a partial movement of the operating handle, and partially heated or warm water can be obtained by a further partial movement of said handle.

Further objects of my invention are to provide a water heating device wherein the normal pressure of the water and steam is utilized for maintaining the control valves in closed position and which provision, together with the peculiar construction of the valves themselves reduces to a minimum the liability of leakage of water or steam through the device.

With the foregoing and other objects in view, my invention consists in certain novel features of construction and arrangement of parts, hereinafter more fully described, claimed and illustrated in the accompanying drawings, in which—

Figure 1 is a front elevational view of a water heating device of my improved construction.

Fig. 2 is an enlarged horizontal section taken approximately on the line 2—2 of Fig. 1.

Fig. 3 is a vertical section taken approximately on the line 3—3 of Fig. 2, with the outer shell or housing of the device removed.

Fig. 4 is a cross section taken approximately on the line 4—4 of Fig. 3.

Fig. 5 is a perspective view of a cylinder utilized in my improved device, and which incloses the mixing chambers for the steam and water.

Referring by numerals to the accompanying drawings, 10 designates a horizontally disposed hollow casing, preferably cylindrical in form, and formed integral therewith is a pair of oppositely disposed outwardly projecting hollow cylindrical members 11.

The rear end of casing 10 is closed by an integral wall 10$^a$ and the forward end of said casing is normally closed by a removable screw cap or plate 12, the same being provided with a centrally arranged stuffing box 13. The outer ends of the hollow members 11 are closed by screw caps 14 and formed through the wall of casing 10 so as to establish communication between the chambers within members 11 and the chamber within casing 10, are apertures 15, and the edges of the material around said apertures are beveled or inclined to form conical valve seats.

Arranged within the chambers in the hollow members 11 are cylindrical valve housings 16 and 17, the same being identical in size and construction and as these valve housings are slightly smaller in diameter than the internal diameters of the openings within said members 11, annular chambers 18 and 19 are formed between said housings and the walls of said members 11. The outer ends of the housings 16 and 17 are closed and their inner ends bear directly against the wall of casing 10 around the openings 15.

Fitting snugly within the inner ends of the valve housings and arranged for sliding movement therein are cups 20 and 21, the same carrying blocks 22 and 23 of rubber or composition, the projecting ends of which normally engage the valve seats formed on the edges of apertures 15. Interposed between the cups 20 and 21 and the rear ends of housings 16 and 17 are compression springs 24, which normally retain the valves upon their seats.

Seated in the cups 20 and 21 are the outer ends of valve stems 25 and 26, the same projecting inwardly through valve members 22 and 23.

Formed through the walls of the housings 16 and 17 and adjacent to their inner ends are apertures 27, the same serving to establish communication between the chambers within said housings and the annular chambers 18 and 19 and under normal conditions or while the valves are closed, the cups 20 and 21 cover the inner ends of these apertures, thereby cutting off communication between the interior of the housings and the annular chambers 18 and 19.

Formed through the wall of the housings 16 and 17 and near their outer ends are apertures 28 which permit steam and water from chambers 18 and 19 to enter the chambers within the valve housings, thus obtaining advantage of the normal pressure of said steam and water to assist the springs 24 in retaining the valves in closed position.

A steam supply pipe 29 is tapped into the wall of member 11 in which annular chamber 18 is formed and a water supply pipe 30 is tapped into the member 11 in which annular chamber 19 is formed.

Positioned within housing 10 is a hollow cylindrical member 31, the rear portion 32 of which is somewhat smaller in diameter than the front portion. The front and rear portions of this cylinder are divided by a perforated partition 33, and formed in the center of said partition is a bearing 34, the same being in alinement with stuffing box 13. The ends of the front portion of this cylindrical member fit snugly against inwardly projecting flanges 35, which are formed integral with casing 10. The front portion of cylinder 31 is smaller in diameter than the internal diameter of casing 10 and thus an annular chamber 36 is formed between said front portion and the outer portion of the wall of said casing and between the flanges 35.

The sides of the outer portion of cylindrical member 31 or those portions adjacent to the openings 15 are perforated as designated by 37, thus establishing communication between the annular chamber 36 and the chamber within the outer portion of member 31.

Formed integral with cylindrical member 10 at the top and bottom thereof and extending between flanges 35 are ribs 10$^b$ which bear against the inner surface of the member 31, thus dividing the chamber 36 into two parts and consequently preventing the steam and water from coming in contact with each other until after said steam and water have passed through the respective sets of apertures 37 and thus entered the mixing chamber in jet form.

The reduced rear end 32 of cylindrical member 31 occupies the rear portion of the chamber within casing 10 and thus forms an annular chamber 38.

Tapped into the rear portion of housing 10 and leading from the annular chamber 38 is an outlet pipe 39 and formed through the wall of the reduced rear portion 32 of the cylindrical member 31 and preferably directly opposite this outlet pipe are apertures 40.

If desired, the outlet pipe 39 can be tapped into the underside of casing 10 and in this event the perforations 40 will be formed in the upper portion of member 32.

Journaled in stuffing box 13 and in bearing 34 is a shaft 41 and fixed thereon within member 31 is a plate provided with a pair of oppositely disposed lugs 42 and 43, the outer edges of which are eccentric with respect to the axis of shaft 41.

The curvature of the edge of lug 42 is regular so that the distance from the axis to successive points on said edge increases gradually, whereas, the edge of lug 43 is concentric with the axis of shaft 41 for a distance of approximately half the length of the lug and from the end of this concentric portion, said lug extends abruptly outward, thus forming a shoulder 43$^a$ which, when the device is operated, imparts a comparatively quick opening movement to the corresponding one of the valves as will be hereinafter more fully described.

The valve stems 25 and 26 extend through suitable apertures 44 formed in the sides of member 31 and the inner ends of said stems are normally positioned directly in the path of travel of the eccentric lugs 42 and 43 as illustrated in Fig. 3.

An outer casing or cover 45 is fixed to and incloses the members 10 and 11 and formed through the front wall of this cover is an opening 46 through which the stuffing box 13 and the forward end of shaft 41 projects.

Formed on cover 45 is a pair of oppositely disposed lugs 47. Adjacent to the right hand one of these lugs appears the word "Off" while adjacent to the other lug appears the word "Hot.". Appearing on the face of the cover 45 between the marked lugs as just described are the words "Warm" and "Cold."

Fixed on the outer end of shaft 45 is one end of a hand lever 48, and formed integral therewith is a rearwardly projecting lug 49 which is adapted to engage against the lugs 47.

The operation of my improved device is as follows:

Under normal conditions or when the valve is closed, the various parts occupy the positions as illustrated in Figs. 1 to 3 inclusive, with the valves closed and held tightly upon their seats by the compression spring 24, together with the pressure of the steam and water which enters the chambers within valve housings 16 and 17 through apertures 28. With the parts thus positioned, the inner end of valve stem 25 is spaced a short distance away from the low portion of the eccentric lug 42 and the end of stem 26 practically touches or is spaced a very slight distance away from the low portion of lug 43. (See Fig. 3).

To open the valves, handle 48 is engaged and swung downward, which movement necessarily rocks shaft 41 and the eccentric lugs carried thereby, but owing to the curvature of the edges of the lugs 42 and 43 and the spaces between same and the ends of valve stems 25 and 26, the steam control valve will not be actuated until this handle has been moved to a point over half the length of its travel, whereas the water control valve will be actuated immediately, or as soon as lug 42 engages stem 26. Thus, when the handle has been moved approximately one-third the distance of its travel, the water control valve will have been moved rearwardly through valve housing 17, a sufficient distance to uncover the apertures 27 with the result that water is permitted to flow from the annular chamber 19 through the open apertures 27, thence through the corresponding aperture 15 into annular chamber 36, thence through apertures 37, thence through the apertures in plate 33 into the chamber within the rear portion 32 of cylindrical member 31, thence through apertures 40 into annular chamber 38, and from thence through outlet pipe 39. This initial discharge of cold water precludes the possibility of a person being burned or scalded with hot water or steam and which action might possibly occur in the event that the live steam valve would open simultaneously with the opening of the water control valve.

As handle 48 is moved to a point opposite the word "Warm" on the casing 45 or approximately two-thirds of the full distance of travel of said handle, the shoulder 43ª on eccentric lug 43 engages stem 25 of the steam control valve, thereby partially opening said valve and permitting a comparatively small quantity of live steam to pass from annular chamber 18 through the apertures 27 of valve housing 16 and from thence through the corresponding opening 15 into annular chamber 36 and from said chamber, said steam passes through the adjacent apertures 37 in member 31 and discharges into the interior of said member in small jets to commingle and mix with the water in said chamber. This mixing action is multiplied as the water and steam discharge through the apertures in wall 33 and through the apertures 40 in member 32 and as a result, the cold water is heated to a considerable degree and in such condition it discharges through outlet pipe 39.

In the event that hot water is desired, the handle is moved the full limit of its stroke or until lug 49 bears against the left hand one of lugs 47. Such action shifts the water and steam control valves to their full open positions so that a comparatively large flow of steam is permitted to mix with the water with the result that said water is heated to a comparatively high degree.

Obviously, a movement of the handle 48 to its normal position with the lug 49 in engagement with the right hand one of the lugs 47, permits both valves to return to their seats, thereby cutting off the further passage of cold water and steam through the device.

Formed on the rear portion of shaft 41 is a lug 50 and formed on the front face of perforated plate 33 is a lug 51. In some installations of my improved device, the housing 45 is dispensed with, and in this event, the lug 50 engaging against lug 51 acts as a stop to limit the valve opening movement of handle 48.

A water heating device of my improved construction is comparatively simple, provides for the thorough and effective mixing and commingling of live steam and cold water to thoroughly heat the latter, and can be advantageously employed wherever hot water is necessary or desirable and live steam and water are available. The device is very compact, presents a neat and finished appearance, and can be readily connected to steam and water pipes already in service.

It will be readily understood that minor changes in the size, form and construction of the various parts of my improved device, can be made and substituted, for those herein shown and described, without departing from the spirit of my invention, the scope of which is set forth in the appended claims.

I claim:

1. In a water heater, a housing provided with a mixing chamber and a pair of oppositely disposed valve chambers, there being openings from said valve chambers to the mixing chamber, tubular connections to the valve chambers, said mixing chamber being provided with an outlet, valve housings in the valve chambers, said valve housings being provided adjacent to their inner ends with openings, valves normally closing the openings into the mixing chamber and the openings in said valve housings, a plurality of perforated walls within the mixing chamber, there being apertures formed in the valve housings near their outer ends to permit fluid to enter the chambers in said valve housings behind the valves therein, a rotatably mounted shaft axially disposed within the mixing chamber, and means on said shaft for engaging parts of the valves to unseat the same.

2. In a water heater, a housing provided with a mixing chamber and a pair of oppositely disposed valve chambers, there being openings from said valve chambers to the mixing chamber, tubular connections to the valve chambers, said mixing chamber being provided with an outlet, valve housings in the valve chambers, said valve housings being provided adjacent to their inner ends with openings, valves normally closing the openings into the mixing chamber and the openings in said valve housings, a plurality of perforated walls within the mixing chamber, springs within the valve housings for normally holding the valves in closed positions, there being apertures formed in the valve housings near their outer ends to permit fluid to enter the chambers in said valve housings behind the valves therein, a rotatably mounted shaft axially disposed within the mixing chamber, and means on said shaft for engaging parts of the valves to unseat the same.

3. In a water heater, a housing provided with a chamber, means for supplying fluids to be mixed to said chamber, a cylindrical member removably positioned within the chamber, there being an annular space around said cylindrical member, a circumferential rib dividing said annular space into two chambers, there being an outlet from one of said chambers, a partition dividing the cylinder into two chambers, and said partition and the wall of the cylinder being perforated so as to divide the fluid passing through the chamber in the housing into jets.

4. In a water heater, a housing provided with a chamber, a cylindrical member removably positioned within said chamber, there being an annular space surrounding said cylindrical member, a rib dividing said annular space into front and rear mixing chambers, a pair of oppositely arranged longitudinally disposed ribs in front of the annular rib and dividing the annular space in front of said rib into two chambers, means for supplying fluid to be mixed to said last mentioned chambers, there being an outlet from the rear end of the annular chambers, and a partition within the cylinder, said partition and the wall of the cylinder being perforated.

5. In a water heater, a housing provided with a centrally disposed chamber, a pair of valve chambers arranged on opposite sides of said central chamber, there being openings from said valve chambers into the central chamber, a cylindrical member removably positioned in the central chamber, there being an annular space around said cylindrical member, an annular rib dividing said annular space into front and rear chambers, there being an outlet from said rear chamber, a perforated partition within the cylindrical member, the wall of said cylindrical member being perforated, valves for closing the openings from the valve chambers to the central chamber, portions of which valves project through the wall of the cylindrical member into the front one of the chambers therein, a shaft axially disposed within said cylindrical member, and means on said shaft for engaging the inwardly projecting portions of the valves and unseating the same.

6. In a water heater, a housing provided with a mixing chamber, a cylindrical member removably positioned within said chamber, there being an annular space around said cylindrical member, an annular rib dividing said annular space into front and rear chambers, longitudinally disposed ribs dividing the space in front of the annular rib into two oppositely disposed inlet chambers, means for supplying fluid to each of said chambers, there being an outlet leading from the rear one of the annular chambers, a perforated partition within the cylindrical member, and the wall of said cylindrical member on both sides of said partition being perforated.

In testimony whereof I hereunto affix my signature in the presence of two witnesses, this 18th day of April, 1916.

WALTER J. WARNER.

Witnesses:
M. P. SMITH,
M. A. HANDEL.

Copies of this patent may be obtained for five cents each, by addressing the "Commissioner of Patents, Washington, D. C."